United States Patent
Jahnke et al.

[19]

[11] Patent Number: 6,149,859
[45] Date of Patent: Nov. 21, 2000

[54] GASIFICATION PLANT FOR DIRECT REDUCTION REACTORS

[75] Inventors: Frederick C. Jahnke, Rye, N.Y.;
James S. Falsetti, New Fairfield, Conn.; Gary A. Foulds, Newcastle; Geoffrey R. Rigby, Charlestown, both of Australia

[73] Assignee: Texaco Inc., White Plains, N.Y.

[21] Appl. No.: 09/019,875

[22] Filed: Feb. 6, 1998

Related U.S. Application Data

[60] Provisional application No. 60/064,044, Nov. 3, 1997.

[51] Int. Cl.[7] ....................................................... C21B 5/56
[52] U.S. Cl. ........................ 266/154; 266/156; 266/171; 60/39.12; 211/197 R; 211/213 R
[58] Field of Search ..................................... 266/171, 154, 266/156; 48/211, 213, 213 R, 197 R; 60/39.12

[56] References Cited

U.S. PATENT DOCUMENTS

| | | | |
|---|---|---|---|
| 4,234,169 | 11/1980 | Scarlett et al. | 266/156 |
| 5,117,623 | 6/1992 | Arundale | 60/39.05 |
| 5,358,696 | 10/1994 | Jahnke | 423/650 |
| 5,380,353 | 1/1995 | Goto et al. | 75/640 |
| 5,744,067 | 4/1998 | Jahnke | 252/373 |
| 6,033,456 | 3/2000 | Jahnke | 75/505 |

*Primary Examiner*—Roy V. King
*Assistant Examiner*—Tima McGuthry-Banks
*Attorney, Agent, or Firm*—Morris N. Reinisch; Rodman & Rodman

[57] ABSTRACT

The present invention is an integrated process and apparatus for supplying at least a portion of the reducing gas feedstock to a reduction reactor, such as a reactor for the direct reduction of iron, wherein the reducing gas contacts a feed material at a mean operating gas pressure and effects reduction of the feed material to provide a reduced product. The integrated process includes gasifying a hydrocarbonaceous feedstock in a partial oxidation reaction to produce a synthesis gas which comprises hydrogen, and carbon monoxide at a pressure substantially greater than the mean operating gas pressure in the reduction reactor. The synthesis gas is expanded to lower its pressure to substantially the mean operating gas pressure in the DRI reduction reactor to thereby form the reducing gas feedstock at the pressure conditions used for the DRI reaction. The lower pressure reducing gas mixture generated by the expansion is introduced into the DRI reactor as part or all of the reducing gas requirement for the direct reduction of iron.

11 Claims, 3 Drawing Sheets

GASIFICATION PLANT FOR DIRECT REDUCTION REACTORS

This application claims the benefit of U.S. Provisional Application No. 60/064,044, filed Nov. 3, 1997.

BACKGROUND OF THE INVENTION

1. Field of the Invention

This invention relates generally to the use of a syngas or synthesis gas produced during a partial oxidation gasification process as the feedstock in a process for the direct reduction of iron also referred to as the "DRI" process.

2. Description of the Prior Art

Fuelled by an anticipated shortage of scrap and an increase in the number of steel mini-mills as alternatives to integrated steel plants, DRI production is currently undergoing a major expansion internationally. Solid feed based DRI processes can essentially be divided into two broad technologies according to the iron ore feed, that is, lump- and/or pellet-based or fines-based feed. Further sub-division can be made according to the hydrocarbon feedstock used, for example coal or gas.

The principal lump/pellet-based technologies are known as "Midrex" and "HYL III," and the fines-based technology is known as the "Fior" process. All employ reformed natural gas as the reducing gas feedstock for the DRI reaction. The HYL III and Fior processes use conventional steam reforming of natural gas to produce a synthesis gas including hydrogen and carbon monoxide. Impurities such as carbon dioxide are removed by scrubbers. The Midrex process employs a combination of steam and carbon dioxide reforming of natural gas in a proprietary reformer.

Given these modes of producing the reducing gas, the most favorable location for a DRI plant is where inexpensive natural gas and high grade iron ore are located in close proximity, since this obviates excessive transportation costs.

Partial oxidation gasification processes are often used to produce a gas comprising hydrogen and carbon monoxide as the major components. This gas is generally referred to as synthesis gas or "syngas." Such partial oxidation gasification processes are most effective when operated at relatively high pressures, generally greater than 20 atmospheres. As used herein, a partial oxidation reactor can also be referred to as a "gasification reactor," or simply a "gasifier" and these terms are often used equivalently and interchangeably.

The feedstock for a partial oxidation reaction is usually a hydrocarbonaceous material, that is, one or more materials, generally organic, which provide a source of hydrogen and carbon for the gasification reaction. The hydrocarbonaceous material can be in a gaseous, liquid or solid state, or in a combination as desired, for example, a solid-liquid composition in a fluidized state. Petroleum based feedstocks include petroleum coke, coal residual oils and byproducts from heavy crude oils. The coal or coke can be in a finely divided state. Waste plastic materials can also be used as the feedstock.

Many uses for the syngas produced from the partial oxidation reaction are at relatively lower pressures. Therefore, expansion of the high pressure syngas across a power recovery machine to obtain a syngas at reduced pressure is often employed. This type of expansion is often used as a means for generating electricity. The power generation step is not 100% efficient and some energy is lost in converting the energy to electricity. The electricity generated in such an expansion process requires step up transformers, additional electrical switchgear, and a use for the electricity.

The DRI process can use syngas as a feedstock, generally fed to the reaction chamber at a relatively low pressure, typically less than about 5 atmospheres for a moving bed reactor, and less than about 15 atmospheres for a fluidized bed reactor. The DRI offgas is cooled, compressed, sent to a carbon dioxide removal step, and then mixed with fresh syngas feed and recycled to the DRI process. The recycle compressor is a large energy user and often uses an electrically driven motor. This electrically driven motor is not 100% efficient and some energy is lost in converting electricity to shaft power. Use of an electrical motor requires step down transformers, additional electrical switchgear, and a source of electricity. Alternately, a steam driver can be used with similar energy losses and supporting equipment.

The operation of gasifiers at relatively high pressures in power generation systems, for example, the integrated gasification combined cycle (IGCC) system is disclosed in U.S. Pat. Nos. 5,117,623 and 5,345,756, wherein these systems are coupled with expanders, gas turbines and steam turbines for power generation. U.S. Pat. Nos. 5,531,424 and 5,370,727 disclose processes for the direct reduction of iron.

SUMMARY OF THE INVENTION

The present invention is an integrated process and apparatus for supplying at least a portion of, or substantially all, or all of the reducing gas feedstock to a reduction reactor, such as a reactor for the direct reduction of iron, wherein the reducing gas contacts a feed material at a mean operating gas pressure and effects reduction of the feed material to provide a reduced product. The integrated process includes gasifying a hydrocarbonaceous feedstock in a partial oxidation reaction to produce a synthesis gas which comprises hydrogen, carbon, and carbon monoxide at a pressure substantially greater than the mean operating gas pressure in the reduction reactor. The synthesis gas is expanded to lower its pressure to substantially the mean operating gas pressure in the DRI reduction reactor to thereby form the reducing gas feedstock at the pressure conditions used for the DRI reaction. The lower pressure reducing gas mixture generated by the expansion is introduced into the DRI reactor as part or all of the reducing gas requirement for the direct reduction of iron.

DESCRIPTION OF THE DRAWINGS

In the drawings.

Corresponding reference numbers indicate corresponding parts and process streams throughout the drawings.

DESCRIPTION OF THE PREFERRED EMBODIMENTS

Figure 1:
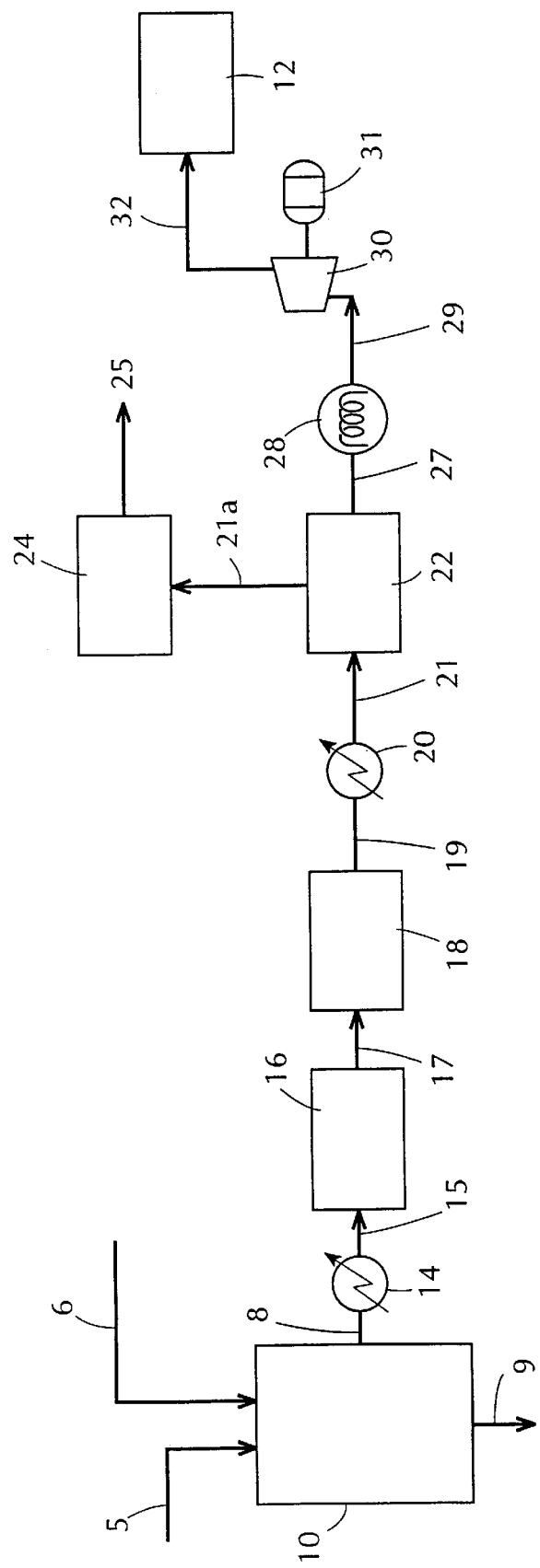
FIG. 1 is a simplified schematic drawing of a gasification process and a DRI process incorporating one embodiment of the invention.

In accordance with the present invention, significant advantages can be obtained by effecting a partial oxidation gasification reaction to produce a synthesis gas or syngas at a pressure substantially greater than the mean operating pressure in the reduction reactor for the direct reduction of iron. The syngas produced from the partial oxidation reaction can then be expanded to lower its pressure to the mean operating pressure for the direct reduction of iron and thereby provide the reducing gas for the DRI reaction. The reducing gas is then contacted with feed material in the direct reduction reactor to effect reduction of the iron oxide therein to produce elemental iron.

All pressures referred to herein are gauge pressures rather than absolute pressures, unless otherwise indicated.

This approach is contrary to conventional gasifier technology practice wherein the gasifier pressure is set to match the pressure of the downstream use. Because of the low mean operating pressure used in the DRI process, operating the gasifier at the same pressure would require larger and more expensive equipment. The gasifier would operate less efficiently at lower pressure, and removal of acid gases, such as $H_2S$ and $CO_2$ would be less efficient.

Preferably, before expansion of the syngas from the partial oxidation reaction to lower its pressure to produce the reducing gas for the DRI reaction, the syngas mixture comprising $H_2$, CO, $CO_2$, $H_2O$, $N_2$, $H_2S$, COS and particulate carbon is partially cooled to about 200° F. to about 700° F., preferably to about 400° F. to about 500° F. and scrubbed to remove particulate materials. After further cooling to about 30° F. to about 150° F., preferably to about 100° F. to about 120° F., the syngas is scrubbed to remove its acid gas content. About 90% to about 100% of the $H_2S$ and COS are removed to prevent degradation of the iron in the DRI process. $CO_2$ is removed to the desired level for the DRI process, on the order of about 50% to about 100%, preferably about 90% to about 98%.

The cooled, scrubbed syngas is then expanded to lower its pressure and to produce power. Expansion is accomplished by a turbo expander which produces mechanical energy that can be used to drive an electrical generator and produce electrical power or used directly to power a compressor, pump, or other device requiring mechanical power. Prior to expanding the syngas to produce power, the syngas is preferably heated to about 300° F. to about 1200° F., preferably about 500° F. to about 900° F., in order to increase the power output of the expander which is approximately proportional to the absolute temperature of the inlet gas.

The high pressure synthesis gas can be treated to remove acid gases such as $CO_2$ and $H_2S$ by scrubbing or contacting with a solvent. The low pressure reducing gas that is fed to the DRI reduction reaction can include a recycle gas stream that exits the DRI reactor and is also treated to remove acid gases, primarily $CO_2$, by scrubbing with a solvent. The same solvent that is used to scrub and remove the acid gas content from the high pressure synthesis gas can also be used to remove acidic gases from the low pressure reducing gas. Therefore, acid gas removal for both the high pressure synthesis gas and the low pressure reducing gas can be advantageously effected in an integrated parallel or series circuit with respect to common stripper or regeneration means.

The synthesis gas can be water saturated and subjected to a shift reaction to vary the relative proportions of hydrogen and carbon monoxide. Typically, the desired $H_2$/CO ratio is between about 1.5 and 10.0 for the DRI process in order to control the heat balance within the DRI reactor. Higher $H_2$/CO ratios can also reduce the power requirements of the recycle compressor since the water produced from the iron reduction reaction with $H_2$ is condensed from the recycle gas prior to compression.

Preferably, the power generated by the syngas expansion and the heat generated by any cooling and shift reaction steps is utilized as a power and energy source in the plant which includes the DRI reduction reactor.

Advantageously, top gas from the reduction reactor is recycled to the DRI reactor as a reducing gas after treatment including compression, and the power generated by the expansion is directly utilized to drive the compression.

In another embodiment, the present invention combines the energy released from lowering the pressure of the syngas with the energy needs of the DRI recycle gas compressor thus eliminating the electrical generation/use inefficiencies and increasing energy efficiency for both processes and minimizing costs. This can be accomplished by determining the DRI recycle process needs and then operating the partial oxidation gasification at a sufficient pressure to meet and match the energy needs of the DRI recycle compressor. This invention can be quite efficient and cost effective with a single shaft configuration. In addition to increasing energy efficiency, much equipment can be eliminated including the recycle gas compressor electric motor drive, a portion of the electric substation, step up and step down transformers and other related infrastructure on the DRI side. On the gasification side, a generator and its associated equipment can be eliminated.

This invention also encompasses a direct reduction apparatus, comprising a direct reduction reactor configured for contacting reducing gas with feed material therein to effect reduction of the feed material to provide a reduced product. The DRI reaction system is designed to function under a mean operating gas pressure of about 1 to about 15 atmospheres. More specifically, a moving bed reactor preferably operates at about 1 to about 5 atmospheres and a fluidized bed reactor preferably operates at about 10 to about 15 atmospheres.

The inventive apparatus also includes means for partially oxidizing a hydrocarbonaceous feedstock to produce a synthesis gas which includes hydrogen and carbon monoxide at a pressure substantially greater than the mean operating gas pressure in the reduction reactor, means in communication with the gasifying means to receive the reducing gas and means to expand the reducing gas to lower its pressure to substantially the mean operating gas pressure in the reduction reactor, and means to feed the lower pressure reducing gas generated by the expansion means to the reactor as at least a portion of the reducing gas feedstock for the direct reduction reaction.

The apparatus can include further means to cool and scrub the synthesis gas and means to remove at least a portion of its acid gas content. Means are also preferably provided to reheat the scrubbed synthesis gas prior to its expansion.

The apparatus can further include means to recycle excess reducing gas from the reduction reactor system back to the reduction reactor system; compressor means to compress the recycle reducing gas; means to remove acid gases, primarily $CO_2$, from the recycle reducing gas; and means to directly couple the expansion means to the compressor means whereby all or part of the power generated by the expansion is directly utilized to drive the compressor means.

The acid gas removal means can employ the same solvent means to remove acid gases from the high pressure synthesis gas and from the low pressure reducing gas. Therefore, the acid gas removal means for both the high pressure synthesis gas and for the low pressure reducing gas can advantageously be incorporated in an integrated parallel or series circuit with respect to common stripper or regeneration means.

Preferably, the apparatus includes a shift reactor for subjecting the reducing gas mixture to a shift reaction to vary the relative proportions of hydrogen and carbon monoxide in the mixture.

Referring to FIG. 1, a hydrocarbonaceous feedstock 5 and air, oxygen, or an oxygen-enriched air stream 6 is fed in sufficient amounts into a partial oxidation gasifier 10 wherein the feedstock is converted into a synthesis gas 8, typically comprising a mixture of hydrogen, carbon monoxide, steam, carbon dioxide, and trace amounts of other partial oxidation products such as nitrogen, methane, hydrogen sulfide and carbonyl sulfide. The hydrogen to carbon monoxide ratio varies depending on the feedstock and the operating conditions of the gasifier, but typically ranges from about 0.5 to 3.0. The gasifier 10 is operated at an elevated pressure of about 20 to 150 atmospheres, which is well above the mean operating gas pressure used in the DRI reactor 12 wherein the reducing gas mixture 32 is fed after being treated and expanded to lower its pressure to the mean operating gas pressure used in the DRI reactor.

The feedstock 5 can comprise liquid and/or gaseous hydrocarbonaceous fuels and/or a pumpable slurry of solid carbonaceous fuel, and can be fed to the gasifier 10 in the form of a pumpable slurry or dry, depending on the gasifier used. Slag and/or ash 9 are recovered as a waste by-product.

Possible pumpable slurries include coal, particulate carbon, petroleum coke, concentrated sewer sludge, and mixtures thereof, in a vaporizable liquid carrier which can comprise water, liquid $CO_2$, liquid hydrocarbon fuel, and mixtures thereof. Liquid fuels can include liquefied petroleum gas, petroleum distillates and residue, gasoline, naphtha, kerosene, crude petroleum, asphalt, gas oil, residual oil, tar sand oil and shale oil, coal derived oil, aromatic hydrocarbons such as benzene, toluene, and xylene fractions, coal tar, cycle gas oil from fluid-catalytic-cracking operations, furfural extract of coker gas oil, and mixtures thereof.

Gaseous fuels can include vaporized liquid natural gas, refinery off-gas, $C_1$–$C_4$ hydrocarbonaceous gases, and waste carbon-containing gases from chemical processes. Other equivalent feedstocks can be used in each category.

The synthesis gas 8 exiting gasifier 10 is cooled in heat exchanger 14 to a temperature suitable for subsequent scrubbing and modification in a shift reactor. Alternately, it can be quenched with direct water injection into the syngas. This temperature can vary from about 200° F. to about 1200° F., and preferably about 400° F. to about 700° F. Heat exchanger 14 can be used to generate steam, which can be used in other parts of the process or to generate power.

The cooled and/or quenched synthesis gas 15 enters a scrubber 16 where it is scrubbed with water to remove solid particulates such as ash and unconverted carbon such as soot, and water soluble impurities such as ammonia, HCN, alkali metals, chlorides and the like. The syngas becomes saturated with water in the scrubber due to the intimate contact of the water and the syngas.

Gasifier 10 can be any appropriate choice from among the several commercial gasifiers available. A suitable gasifier is the Texaco quench gasifier, which is supplied as an integrated unit including the heat exchanger 14 and the scrubber 16.

The operating pressure of the gasifier 10 can vary from about 20 to 100 atmospheres, preferably about 25 to about 80 atmospheres, and would typically be an order of magnitude greater than the DRI process, for example between about 5 and about 20 times the mean operating gas pressure of the DRI process. The exact operating pressure of the gasifier is chosen by economic optimization of the configuration.

The scrubbed, saturated synthesis gas 17 can be fed, if desired, to a shift reactor 18 where the hydrogen to carbon monoxide ratio is altered to meet the requirements of the particular DRI process. The desired hydrogen to carbon monoxide ratio can vary considerably depending on the DRI technology employed, and typically varies from about 1.5:1 to pure hydrogen. The exothermic shift reaction converts water and carbon monoxide to hydrogen and carbon dioxide. Multiple bed shift reactors can be used with intermediate cooling of the gas between the reactor beds to increase the conversion of CO to $H_2$.

For a single bed reactor or the first reactor of a multiple bed reactor system, the "shifted" syngas stream 19 containing hydrogen and carbon monoxide exits shift reactor 18 at a temperature of about 550° F. to about 1100° F., preferably about 800° F. to about 950° F. For second and subsequent reactors of a multiple bed reactor system, the "shifted" syngas stream 19 containing hydrogen and carbon monoxide exits shift reactor 18 at a temperature of about 450° F. to about 750° F., preferably about 500° F. to about 650° F. The heat generated by the shifted syngas stream 19 is removed in heat exchanger 20 and used to generate steam for use in other parts of the process.

The cool, shifted synthesis gas stream 21 exits heat exchanger 20 and enters an acid gas removal system 22 where sulfur-containing compounds and carbon dioxide are removed. A number of acid gas removal systems are commercially available and selection will depend on the degree of sulfur compound and carbon dioxide removal required by the DRI process and the operating pressure of the acid gas removal system.

The acid gas stream 21a that is removed in the acid gas removal system 22 enters a sulfur recovery unit 24, wherein elemental sulfur 25 or sulfuric acid can be recovered by known means. The particular acid gas removal system 22 that is used will determine the required degree of cooling of the shifted synthesis acid that enters the acid gas removal system 22. The temperature of the acid-removed or "sweet" synthesis gas stream 27 exiting gas removal system 22 typically varies from about 30° F. to about 150° F. and preferably about 80° F. to about 120° F. The acid gas removal system 22 can be designed to expel or vent part or all of the $CO_2$ (not shown) separately from the $H_2S$ or both the $H_2S$ and $CO_2$ can be routed to the sulfur recovery unit 24.

After acid gas removal, the synthesis gas stream 27 is reheated via heat exchanger 28 to a temperature of about 300° F. to about 1500° F. The pressure of hot syngas stream 29 is then reduced via a gas expander 30 to the desired pressure for the DRI process. The amount of preheat in the exchanger 28 is determined by the required exit pressure from the expander 30 which generates power in power generator 31. Typically, the temperature of syngas/reducing gas stream 32 exiting expander 30 is about 100° F. to about 500° F. and its pressure is about 0.5 to about 15 atmospheres. The syngas/reducing gas stream 32 is now at the mean operating pressure for the DRI process and constitutes the reducing gas feedstock.

Prior to entering the DRI process, the reducing gas 32 can be further heated, typically from about 800° F. to about 1500° F., to provide the desired operating temperature for the DRI process. The syngas 8 exiting the gasifier 10 has thus been converted into the reducing gas 32 entering the DRI process system 12. Therein, the reducing gas 32 reduces iron ore to metallic iron, typically by being passed counterflow to and in contact with the iron ore.

A number of DRI processes are commercially available, using either pellet or fines based iron ore feeds, and the present invention is considered applicable to these processes.

Figure 2:
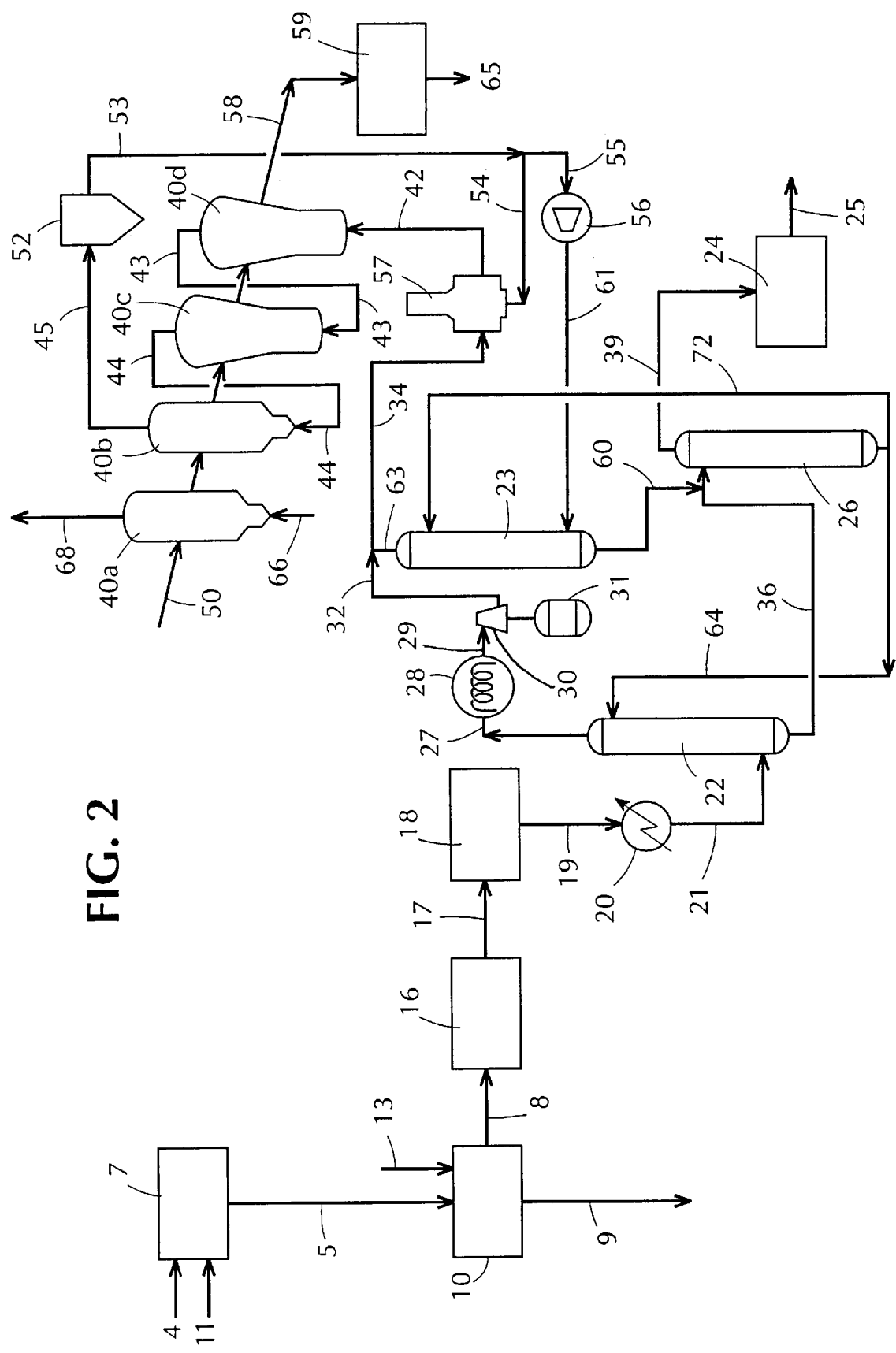
FIG. 2 is a simplified schematic drawing of a gasification process and a DRI process incorporating a second embodiment of the invention.

Referring now to FIG. 2, bulk coal 4 is ground in grinding mill 7 to form ground coal which is slurried with water 11 to form the hydrocarbonaceous slurry feedstock 5 which is pumped into the gasifier 10. The preferred gasifier is a down-flow quench gasifier integrated with the Fior process. Air, oxygen or oxygen enriched air stream 13 is fed co-currently with the slurry feedstock 5 into the gasifier 10, which is an entrained flow gasifier comprising a gasification zone and a quench zone and operates at about 50 atmospheres pressure. The reaction temperature in the gasification zone is about 1100° C. to about 1600° C. The hot syngas produced from the reaction in the gasification zone passes into the quench zone where it is quenched with water to remove slag 9 and to partially clean the syngas which is saturated with water and exits the quench zone of the gasifier 10 as stream 8 at about 250° C. and about 50 atmospheres pressure. The syngas stream 8 is water-scrubbed in soot scrubber 16, which removes substantially all entrained particulates, alkali metals, heavy metals, and chlorides.

The scrubbed, saturated syngas 17 then enters the shift reactor 18 where the $H_2$ to CO ratio is adjusted to above 6, as desired for the DRI reaction system. The shifted syngas stream 19 is cooled in heat exchanger 20 from about 450° C. to about 40° C. before exiting as syngas stream 21 which enters the high pressure acid gas absorber 22, wherein all or most of the $H_2S$ and $CO_2$ is removed from the syngas by a solvent.

The liquid solvent containing the acid gases is commonly referred to as "rich" solvent, and exits high pressure gas absorber 22 as liquid stream 36, and enters the $CO_2/H_2S$ stripper/regenerator plant 26 wherein the rich solvent is heated and stripped of $H_2S$ and $CO_2$ to produce lean solvent streams 64 and 72 and an overhead gas stream 39 containing $H_2S$ and $CO_2$. Stream 39 enters the sulfur recovery unit 24 which can be a Claus system, wherein the sulfur 25 is recovered in its elemental form.

The $H_2S$-free syngas stream 27 exits the high pressure gas absorber 22 with its acid gas content substantially removed and is commonly referred to as "sweet syngas." Sweet syngas stream 27 is reheated in heat exchanger 28 from about 40° C. to about 500° C. to form heated syngas stream 29 which enters gas expander 30 to generate power in power generator 31. Sweet syngas stream 32 exits gas expander 30 at a lower pressure of about 10–12 atmospheres, which is the mean operating gas pressure used in the DRI reactor train of the Fior process.

By way of example, for typical feed rates of 70–80 tonnes/hour coal, 60–70 tonnes/hour oxygen, and 250 tonnes/hour iron ore fines, a pressure change at expander 30 from about 50 atmospheres to about 10–12 atmospheres can produce about 10 megawatts of power.

Sweet syngas stream 32 is combined with recycle top gas stream 63 which exits low pressure acid gas absorber 23. The combined gas stream 34 is at the operating pressure of the DRI reactors and consequently constitutes the reducing gas stream 34. The reducing gas stream 34 enters reheater 57 where it is heated to a temperature of about 1200° F. and exits as heated reducing gas stream 42 which enters fluidized bed DRI reactor 40d.

The core component of the Fior plant is an inclined cascade of four fluidized bed DRI reactors 40a, 40b, 40c, and 40d. Iron ore fines 50 delivered to the uppermost reactor 40a pass successively down through the reactors. The first reactor 40a, is a preheater while the other three are reducing reactors. In reactors 40b, 40c and 40d, the fines pass against a counterflow of reducing gas 42 which metallizes the iron ore and also serves as the fluidizing gas for the fluidized beds.

The reducing gas 42 is delivered to the lowermost reactor 40d via a gas inlet plenum assembly (not shown) and exits as top gas 43 which enters reactor 40c as the reducing gas and exits as top gas 44 which enters reactor 40b as the reducing gas and exits as top gas 45 which enters scrubber 52. Within each of the three reducing reactors, there are multiple cyclones (not shown) for cleaning the top gas of fine iron dust, which is returned to the respective fluidized beds via diplegs (not shown).

In scrubber 52, particulate materials and water are removed from the top gas 45, which is cooled to about 100° F. and exits as cooled, clean, particulate-free top gas stream 53, which is split into clean top gas streams 54 and 55. Clean top gas stream 54 serves as the fuel for reheater 57 and can also be supplemented with natural gas as desired.

Clean top gas stream 55 enters compressor 56 where it is compressed to about 11 to about 14 atmospheres and exits as compressed top gas stream 61, which enters low pressure acid gas absorber 23, wherein its $CO_2$ content is reduced by about 10% to 100%, and preferably by about 60% to 95%. The $CO_2$-reduced gas exits the low pressure acid gas absorber 23 as stream 63 which is combined with reduced pressure sweet syngas stream 32 to form reducing gas stream 34, which enters reheater 57 where it is heated to form heated reducing gas stream 42 that enters reactor 40d.

In the uppermost pre-heater reactor 40a, natural gas 66 serves both as the fluidizing gas and as fuel. The effluent gas 68 exiting reactor 40a is separately scrubbed and treated (not shown). In an alternative arrangement, the top gas from reducing reactor 40b can be used as the fluidizing heating gas in the pre-heater reactor 40a.

The metallized iron product 58 exiting the lowermost reactor 40d is directed to a briquetting plant 59. The output is referred to as hot briquetted iron 65 or HBI. The space comprising the iron ore feed system (not shown), DRI reactors 40a to 40d, and the briquetting plant 59 is maintained sealed under a mean operating gas pressure of about 10–12 atmospheres to minimize reoxidation of the iron.

FIG. 2 also depicts an embodiment of the invention wherein acid gas removal from the higher pressure synthesis gas and the lower pressure recycle reducing gas is integrated. The high pressure acid gas absorber 22 and the low pressure acid gas absorber 23 each use a common solvent solution to remove acid gases, such as an amine or Selexol® (Union Carbide Co.), and such solvent circulates via the common $H_2S/CO_2$ stripper or solvent regenerator 26. The solvent solution absorbs and removes the acid gases which come into contact with it in the respective absorbers.

FIG. 2 depicts the simplest form of integration which is a parallel configuration wherein the liquid solvent stream 36 containing acid gases $CO_2$ and $H_2S$ exits high pressure absorber 22. At the same time, liquid solvent stream 60, also containing acid gases, primarily $CO_2$, exits low pressure absorber 23. Both streams 60 and 36 enter the $CO_2/H_2S$ stripper/regenerator 26 wherein the $CO_2$ and $H_2S$ is removed from the solvent, thereby regenerating the solvent to form a "lean solvent" exiting stripper/regenerator 26 which is divided into solvent streams 64 and 72.

Solvent stream 64 is recycled to high pressure absorber 22 for reuse, and solvent stream 72 is recycled to low pressure absorber 23 for reuse.

The stripped $CO_2$ and $H_2S$ gas stream 39 exits the top of stripper/regenerator 26 and enters sulfur recovery unit 24 wherein elemental sulfur 25 is recovered.

Figure 3:
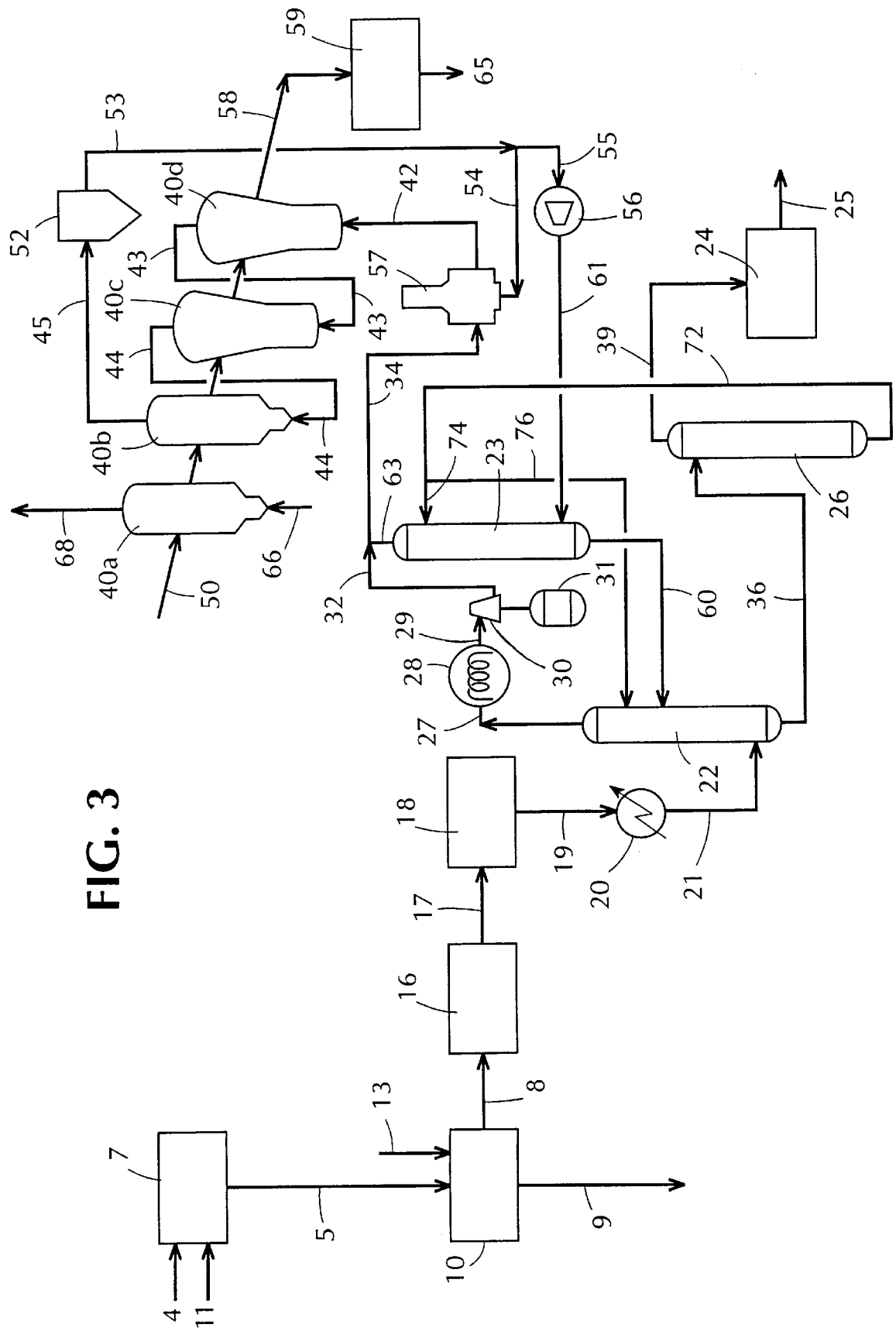
FIG. 3 is a simplified schematic drawing of a gasification process and a DRI process incorporating a third embodiment of the invention.

FIG. 3 is a variation of the process of FIG. 2 wherein the integrated removal of the acid gases is accomplished by means of a series configuration. Thus, only the liquid solvent stream 36 exiting the high pressure absorber 22 enters the $CO_2/H_2S$ stripper/regenerator 26. The regenerated lean solvent stream 72 exiting stripper/regenerator 26 is divided into streams 74 and 76. Solvent stream 74 enters the low pressure acid gas absorber 23 for reuse and solvent stream 76 enters high pressure acid gas absorber 22 for reuse. The liquid solvent stream 60 exiting low pressure acid gas absorber 23 is also directed to high pressure acid gas absorber 22 where the loading of the acid gas in the solvent can be increased due to the higher operating pressure of the high pressure gas absorber 22. The increased loading of $CO_2$ in the solvent stream 60 entering the high pressure absorber 22 reduces the required solvent circulation rate.

In a modification which achieves more efficient plant integration, the synthesis gas expander 30 can be directly coupled to the compressor 56 which compresses the recycled reducing gas from the DRI process. In this manner the power generator 31 or expander 30 can directly drive the compressor 56. Having the power output 31 of the expander 30 directly coupled to the recycle compressor 56 offers the advantages of eliminating the need for a generator on the expander side, and a motor on the compressor side, along with their associated electrical hookups as well as increasing the efficiency by avoiding the energy losses in converting mechanical power to electrical power and back to mechanical power.

Even if the expander and compressor loads do not match, many benefits can be realized. For the case of non-equal loads, a motor/generator could be attached on the shaft to allow power to be exported or imported as required. The motor/generator would still be much smaller than required by a non-coupled generator and motor and the efficiency can still be improved.

The syngas composition and pressure can be adjusted to meet the needs of any of the current commercial DRI processes based on syngas production, including the HYL III, Midrex and Fior processes and other processes such as Finmet and Circored.

The present invention is adaptable to a variety of geographical and feedstock circumstances, and offers many operational advantages. By setting the gasifier pressure well above the mean operating gas pressure of the DRI reactor(s), an expander can be used to generate power for the plant. By optimizing the expander conditions, including the syngas reheat and acid gas removal systems, most or all of the power required can be generated to satisfy the needs of gas production and preparation, and/or the DRI plant.

What is claimed is:

1. A reduction system comprising:
   (a) a direct reduction reaction subsystem for reducing a feed material with a reducing gas at a first pressure range;
   (b) a partial oxidation gasification subsystem including a gasifier for gasifying a hydrocarbonaceous feedstock to produce a synthesis gas at a second pressure range that is substantially greater than the first pressure range of the reducing gas; and
   (c) conversion means in communication with the direct reduction reaction subsystem and the partial oxidation gasification subsystem to lower the second pressure range of the synthesis gas to the first pressure range of the reducing gas and to convert the synthesis gas to the reducing gas.

2. The reduction system as claimed in claim 1 wherein the conversion means includes gas expander means for receiving the synthesis gas and lowering the second pressure range of the synthesis gas to approximately the first pressure range of the reducing gas.

3. The reduction in system as claimed in claim 2 including power conversion means communicating with said gas expander means to convert gas expansion energy from the gas expander means to energy for a power unit.

4. The reduction system as claimed in claim 3 wherein the power unit is a generator.

5. The reduction system as claimed in claim 1 wherein said partial oxidation gasification subsystem includes,
   (i) cooling and scrubbing means in series with the gasifier to cool and scrub the synthesis gas that exits the gasifier;
   (ii) means to remove acid gas content from the cooled and scrubbed synthesis gas, in series with the cooling and scrubbing means; and,
   (iii) means to reheat the cooled and scrubbed synthesis gas, communicable with the cooling and scrubbing means.

6. The reduction system as claimed in claim 1 wherein the direct reduction reaction subsystem includes a direct reduction reactor having a reducing gas entrance and a reducing gas exit, said direct reduction reaction subsystem further including
   (i) means to cool and scrub reducing gas that exits the direct reduction reactor;
   (ii) means to remove acid gas content, communicable with the means to cool and scrub reducing gas; and,
   (iii) means to recycle the cooled, scrubbed, and acid gas-free reducing gas as a portion of the reducing gas that enters the direct reduction reactor.

7. The reduction system as claimed in claim 6 wherein the means to remove acid gas content from the cooled and scrubbed synthesis gas, and the means to remove acid gas content from the reducing gas, are incorporated in an integrated parallel circuit that is common to the direct reduction reaction subsystem and the partial oxidation gasification subsystem.

8. The reduction system as claimed in claim 6 wherein the means to remove acid gas content from the cooled and scrubbed synthesis gas, and the means to remove acid gas content from the reducing gas are incorporated in an integrated series circuit that is common to the direct reduction reaction subsystem and the partial oxidation gasification subsystem.

9. The reduction system as claimed in claim 7 wherein the direct reduction reaction subsystem includes compressor means to compress the recycle reducing gas, and means to directly couple the gas expander means to the compressor means such that gas expansion energy generated by said gas expander means is adapted to drive said compressor means.

10. The reduction system as claimed in claim 8 wherein the direct reduction reaction subsystem includes compressor means to compress the recycle reducing gas, and means to directly couple the gas expander means to the compressor means such that gas expansion energy generated by said gas expander means is adapted to drive said compressor means.

11. The reduction system as claimed in claim 1 wherein said partial oxidation gasification subsystem includes a shift reactor in series with the gasifier for subjecting the synthesis gas that exits the gasifier to a shift reaction to vary the relative proportion of hydrogen and carbon monoxide in the synthesis gas.

* * * * *